(12) United States Patent
Drapkin et al.

(10) Patent No.: US 9,408,052 B2
(45) Date of Patent: Aug. 2, 2016

(54) TECHNIQUES FOR POWER CONSERVATION IN EMERGENCY BROADCAST MESSAGE RECEPTION

(71) Applicant: QUALCOMM Incorporated, San Diego, CA (US)

(72) Inventors: Vitaly Drapkin, San Diego, CA (US); Bhanu Kiran Janga, Hyderabad (IN); Shyamal Ramachandran, San Diego, CA (US); Ajit Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/103,272

(22) Filed: Dec. 11, 2013

(65) Prior Publication Data
US 2014/0179255 A1 Jun. 26, 2014

Related U.S. Application Data

(60) Provisional application No. 61/745,170, filed on Dec. 21, 2012.

(51) Int. Cl.
| | |
|---|---|
| *H04W 4/22* | (2009.01) |
| *H04L 12/18* | (2006.01) |
| *H04L 12/58* | (2006.01) |
| *H04M 3/00* | (2006.01) |
| *H04W 76/00* | (2009.01) |
| *H04W 52/02* | (2009.01) |
| *H04W 4/06* | (2009.01) |

(52) U.S. Cl.
CPC .................. *H04W 4/22* (2013.01); *H04L 12/18* (2013.01); *H04L 12/1895* (2013.01); *H04L 51/00* (2013.01); *H04M 3/00* (2013.01); *H04W 52/028* (2013.01); *H04W 76/007* (2013.01); *H04L 12/189* (2013.01); *H04W 4/06* (2013.01)

(58) Field of Classification Search
CPC ....... H04W 4/06; H04W 4/22; H04W 76/007; H04H 20/59
See application file for complete search history.

(56) References Cited

U.S. PATENT DOCUMENTS

| | | | |
|---|---|---|---|
| 7,668,261 | B2 | 2/2010 | Paila |
| 2004/0027999 | A1 | 2/2004 | Casaccia et al. |
| 2007/0049344 | A1* | 3/2007 | Van Der Velde et al. ...... 455/560 |
| 2007/0275682 | A1* | 11/2007 | Adachi ...................... 455/185.1 |
| 2009/0196226 | A1 | 8/2009 | Shibao |
| 2010/0075625 | A1* | 3/2010 | Wu ........................ H04W 4/22 455/404.1 |
| 2010/0183031 | A1* | 7/2010 | Dalsgaard et al. ............. 370/474 |
| 2011/0002250 | A1* | 1/2011 | Wang et al. .................... 370/311 |
| 2011/0037590 | A1* | 2/2011 | Kannan ..................... 340/539.13 |
| 2011/0171923 | A1* | 7/2011 | Daly et al. ................. 455/404.1 |
| 2011/0171929 | A1* | 7/2011 | Tamura et al. ............. 455/404.1 |
| 2011/0320856 | A1 | 12/2011 | Deivasigamani et al. |
| 2013/0176951 | A1 | 7/2013 | Dhanda et al. |

* cited by examiner

*Primary Examiner* — K Wilford Shaheed
*Assistant Examiner* — Ernest Tacsik
(74) *Attorney, Agent, or Firm* — Holland & Hart LLP

(57) ABSTRACT

Techniques are described for power conservation in emergency broadcast message reception in a wireless communications system. In accordance with a method for conserving power, one or more segments of an emergency broadcast message in an access stratum are received. The emergency broadcast message is identified as a duplicate emergency broadcast message based at least in part on one or more identifiers of the received one or more segments. The receipt of additional segments of the emergency broadcast message is terminated.

16 Claims, 15 Drawing Sheets

| | |
|---|---|
| SIB1 | Provides, among other things, cell access information and information about the time-domain scheduling of other SIBs |
| | ⋮ |
| SIB10 | Provides Earthquake and Tsunami Warning System (ETWS) information |
| SIB11 | Provides Earthquake and Tsunami Warning System (ETWS) information |
| SIB12 | Provides Commercial Mobile Alert System (CMAS) information |
| | ⋮ |

500

TECHNIQUES FOR POWER CONSERVATION IN EMERGENCY BROADCAST MESSAGE RECEPTION

CROSS REFERENCE

The present Application for Patent claims priority benefit of U.S. Provisional Patent Application No. 61/745,170, entitled "POWER CONSERVATION IN BROADCAST MESSAGE RECEPTION", filed on Dec. 21, 2012, assigned to the assignee hereof and expressly incorporated by reference herein.

FIELD OF DISCLOSURE

The present disclosure relates to wireless communication systems, and more particularly to techniques for power conservation in emergency broadcast message reception.

BACKGROUND

Wireless communications networks are widely deployed to provide various communication services such as voice, video, packet data, messaging, broadcast, and the like. These wireless communications networks may be multiple-access networks capable of supporting multiple users by sharing the available network resources.

A wireless communications network may include a number of base stations that may support communication for a number of mobile devices. A mobile device may communicate with a base station via downlink and uplink. The downlink (or forward link) refers to the communication link from the base station to the mobile device, and the uplink (or reverse link) refers to the communication link from the mobile device to the base station.

Some wireless communications systems may implement an emergency broadcast message service in which emergency messages are repeatedly broadcast to multiple mobile devices. For example, natural disaster notifications are a type of emergency broadcast message that may be broadcast in this manner.

SUMMARY

The present disclosure For example relate to techniques for power conservation in emergency broadcast message reception in a wireless communications system.

In some examples, methods for emergency broadcast message reception in a wireless communications system are described. In one example, one or more segments of a first emergency broadcast message in an access stratum are received. The first emergency broadcast message may be identified as a duplicate emergency broadcast message based at least in part on one or more identifiers of the received one or more segments. The receipt of additional segments of the first emergency broadcast message may be terminated.

In one example, a number of segments used to assemble a second emergency broadcast message are identified, and the reception of emergency broadcast messages may be resumed following a time period corresponding to the identified number of segments. Resuming reception of emergency broadcast messages may in some cases include resuming reception of a system information block (SIB) used to emergency broadcast segments of the emergency broadcast messages. The identified number of segments used to assemble the second emergency broadcast message may in some cases indicate a length of the first emergency broadcast message.

In another example, terminating the receipt of additional segments of the first emergency broadcast message may include terminating the receipt of a system information block (SIB) used to emergency broadcast segments of the first emergency broadcast message.

In one example, the first emergency broadcast message may be or include a commercial mobile alert system (CMAS) notification. In another configuration, the first emergency broadcast message may be or include an earthquake and tsunami warning system (ETWS) notification.

An apparatus for emergency broadcast message reception in a wireless communications system is also described. In one example, the apparatus includes a processor, a memory in electronic communication with the processor, and instructions stored in the memory. The instructions are executable by the processor to receive one or more segments of a first emergency broadcast message in an access stratum. The instructions are also executable by the processor to determine whether the first emergency broadcast is a duplicate emergency broadcast message based at least in part on one or more identifiers of the received one or more segments, and to terminate the receipt of additional segments of the first emergency broadcast message.

In one example, the instructions are further executable by the processor to identify a number of segments used to assemble a second emergency broadcast message, and to resume reception of emergency broadcast messages following a time period corresponding to the identified number of segments. The instructions to resume reception of emergency broadcast messages may in some cases resume reception of a system information block (SIB) used to emergency broadcast segments of the emergency broadcast messages. The identified number of segments used to assemble the second emergency broadcast message may in some cases indicate a length of the first emergency broadcast message.

In another example, the instructions to terminate the receipt of additional segments of the first emergency broadcast message terminate the receipt of a system information block (SIB) used to emergency broadcast segments of the first emergency broadcast message.

In one example, the first emergency broadcast message may be or include a commercial mobile alert system (CMAS) notification. In another configuration, the first emergency broadcast message may be or include an earthquake and tsunami warning system (ETWS) notification.

Another apparatus for emergency broadcast message reception in a wireless communications system is also described. The apparatus includes means for receiving one or more segments of a first emergency broadcast message in an access stratum, means for determining whether the first emergency broadcast is a duplicate emergency broadcast message based at least in part on one or more identifiers of the received one or more segments, and means for terminating the receipt of additional segments of the first emergency broadcast message.

In one example, the apparatus further includes means for identifying a number of segments used to assemble a second emergency broadcast message, and means for resuming reception of emergency broadcast messages following a time period corresponding to the identified number of segments. The means for resuming reception of emergency broadcast messages may in some cases include means for resuming reception of a system information block (SIB) used to emergency broadcast segments of the emergency broadcast messages. The identified number of segments used to assemble the second emergency broadcast message may in some cases indicate a length of the first emergency broadcast message.

In another example, the means for terminating the receipt of additional segments of the first emergency broadcast message may include means for terminating the receipt of a system information block (SIB) used to emergency broadcast segments of the first emergency broadcast message.

In one example, the first emergency broadcast message may be or include a commercial mobile alert system (CMAS) notification. In another configuration, the first emergency broadcast message may be or include an earthquake and tsunami warning system (ETWS) notification.

A computer program product for emergency broadcast message reception in a wireless communications system is also described. The computer program product includes a non-transitory computer-readable medium storing instructions executable by a processor to receive one or more segments of a first emergency broadcast message in an access stratum, determine whether the first emergency broadcast is a duplicate emergency broadcast message based at least in part on one or more identifiers of the received one or more segments, and terminate the receipt of additional segments of the first emergency broadcast message.

In one example, the instructions are further executable by the processor to identify a number of segments used to assemble a second emergency broadcast message, and to resume reception of emergency broadcast messages following a time period corresponding to the identified number of segments. The instructions to resume reception of emergency broadcast messages may in some cases resume reception of a system information block (SIB) used to emergency broadcast segments of the emergency broadcast messages. The identified number of segments used to assemble the second emergency broadcast message may in some cases indicate a length of the first emergency broadcast message.

In another example, the instructions to terminate the receipt of additional segments of the first emergency broadcast message terminate the receipt of a system information block (SIB) used to emergency broadcast segments of the first emergency broadcast message.

In one example, the first emergency broadcast message may be or include a commercial mobile alert system (CMAS) notification. In another configuration, the first emergency broadcast message may be or include an earthquake and tsunami warning system (ETWS) notification.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described examples are directed to techniques for power conservation in emergency broadcast message reception for a wireless communications system. Some wireless communications systems may implement an emergency broadcast message service in which emergency messages may be repeatedly broadcast to multiple UEs. For example, natural disaster notifications may be a type of emergency broadcast message that may be broadcast in this manner. Because the repeated or "duplicate" messages (or notifications) may be discarded, a device may unnecessarily use power to receive and process a duplicate message. In some examples, a device may not be aware of the length of the duplicate message. If the device terminates the receipt of a duplicate message, the device may not be aware of when to start receiving emergency broadcast messages, which may not be duplicate messages. As a result, the UE may receive the entirety of the duplicate message, despite the duplicate message not being needed.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described herein may be performed in an order different from that described, and various steps may be added, omitted, or combined. Also, features described with respect to certain examples may be combined in other examples.

Figure 1:
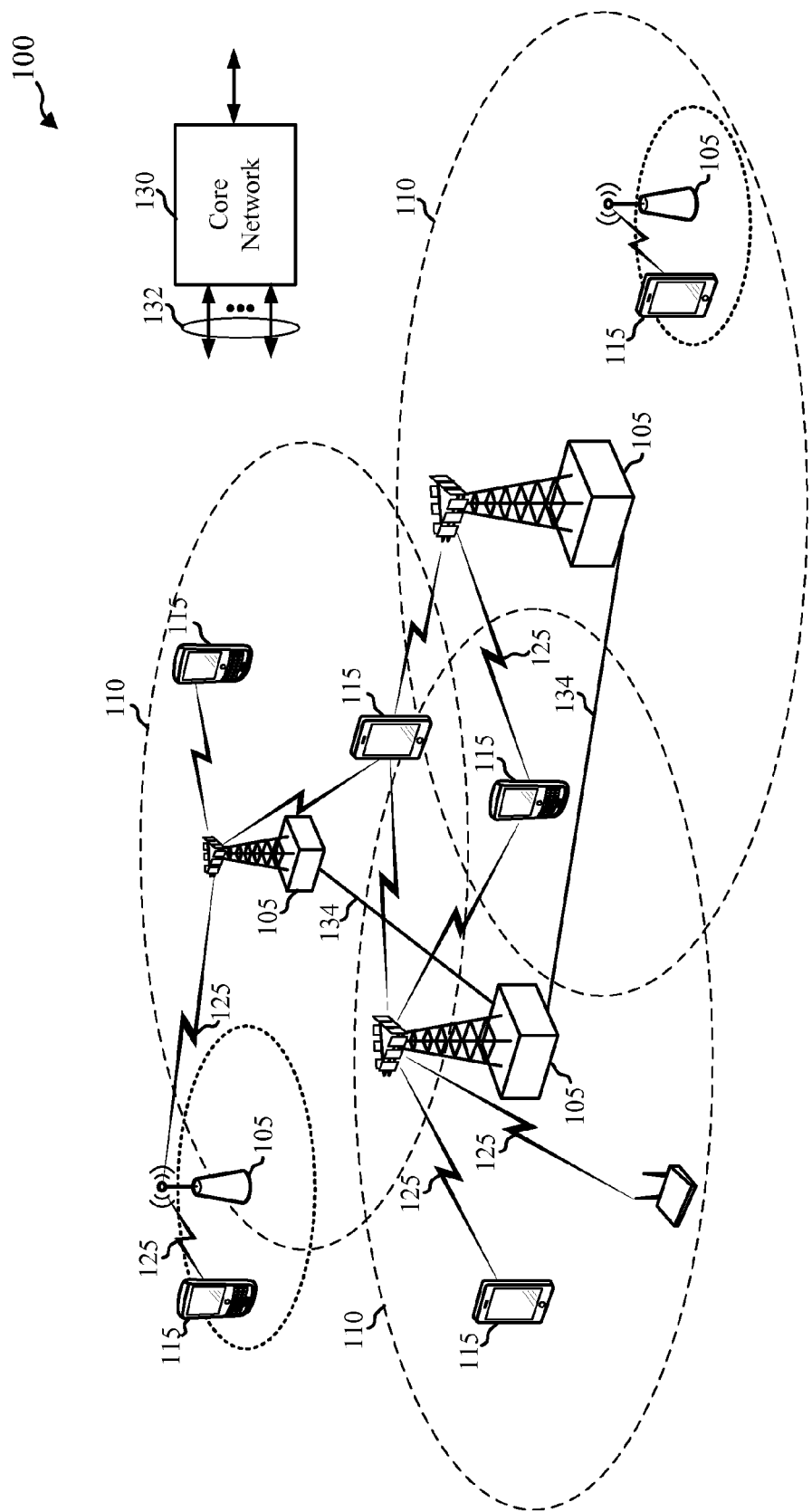
FIG. 1 is a block diagram illustrating an example of a wireless communications system in accordance with aspects of the present disclosure.

FIG. 1 is a block diagram illustrating an example of a wireless communications system 100 in accordance with aspects of the present disclosure. The wireless communications system 100 includes base stations (or cells) 105, UEs 115, and a core network 130. The base stations 105 may communicate with the UEs 115 under the control of a base station controller, which may be part of the core network 130 or the base stations 105 in various examples. Base stations 105 may communicate control information and/or user data with the core network 130 through backhaul links 132. In some examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters may transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UE 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The geographic coverage area 110 for a base station may be divided into sectors making up only a portion of the coverage area. The wireless communications system 100 may include base stations 105 of different types (e.g., macro, micro, and/or pico base stations). There may be overlapping coverage areas for different technologies.

In some examples, the wireless communications system 100 may be an LTE/LTE-A network. LTE/LTE-A, as used throughout the specification, refers to Long Term Evolution and Long Term Evolution-Advanced. LTE, LTE logo, and LTE-Advanced logo are trademarks of the European Telecommunications Standards Institute (ETSI). In LTE/LTE-A networks, the terms evolved Node B (eNB) and user equipment (UE) may be used to describe the base stations 105 and UEs 115, respectively. The wireless communications system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. A macro cell, for example, may cover a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul link 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In accordance with some examples, the wireless communications system 100 may implement an emergency broadcast message service. An emergency broadcast message service may enable emergency messages to be broadcasted to all of the UEs 115 in a particular area. For example, a cell emergency broadcast service (CBS) may enable emergency messages to be broadcasted to all of the UEs 115 within a geographic coverage area 110 of an base station 105.

One type of CBS may be the Public Warning System (PWS) described in 3GPP documents. PWS includes systems such as the Earthquake and Tsunami Warning System (ETWS), the Commercial Mobile Alert System (CMAS), and the Korean Public Alert System. For example, ETWS and CMAS notifications may be transmitted to UEs 115 on a repetitive basis, to ensure receipt of these warning notifications by the UEs 115 within a particular geographic region (e.g., a region in which users of UEs 115 may be affected by the arrival of a tsunami). Because of the repetitiveness of ETWS and CMAS notifications, it may be beneficial for UEs 115 to implement a duplicate notification detection function. Upon detection of a duplicate notification, a UE 115, for example, may terminate receipt of the duplicate notifications, thereby conserving power or freeing up resources (e.g., processing capabilities) for other purposes. While the wireless communications system 100 is described above in relation to LTE/LTE-Advanced architectures, those skilled in the art will readily appreciate, the various concepts presented throughout this disclosure may be extended to other types of wireless networks.

Figure 2:
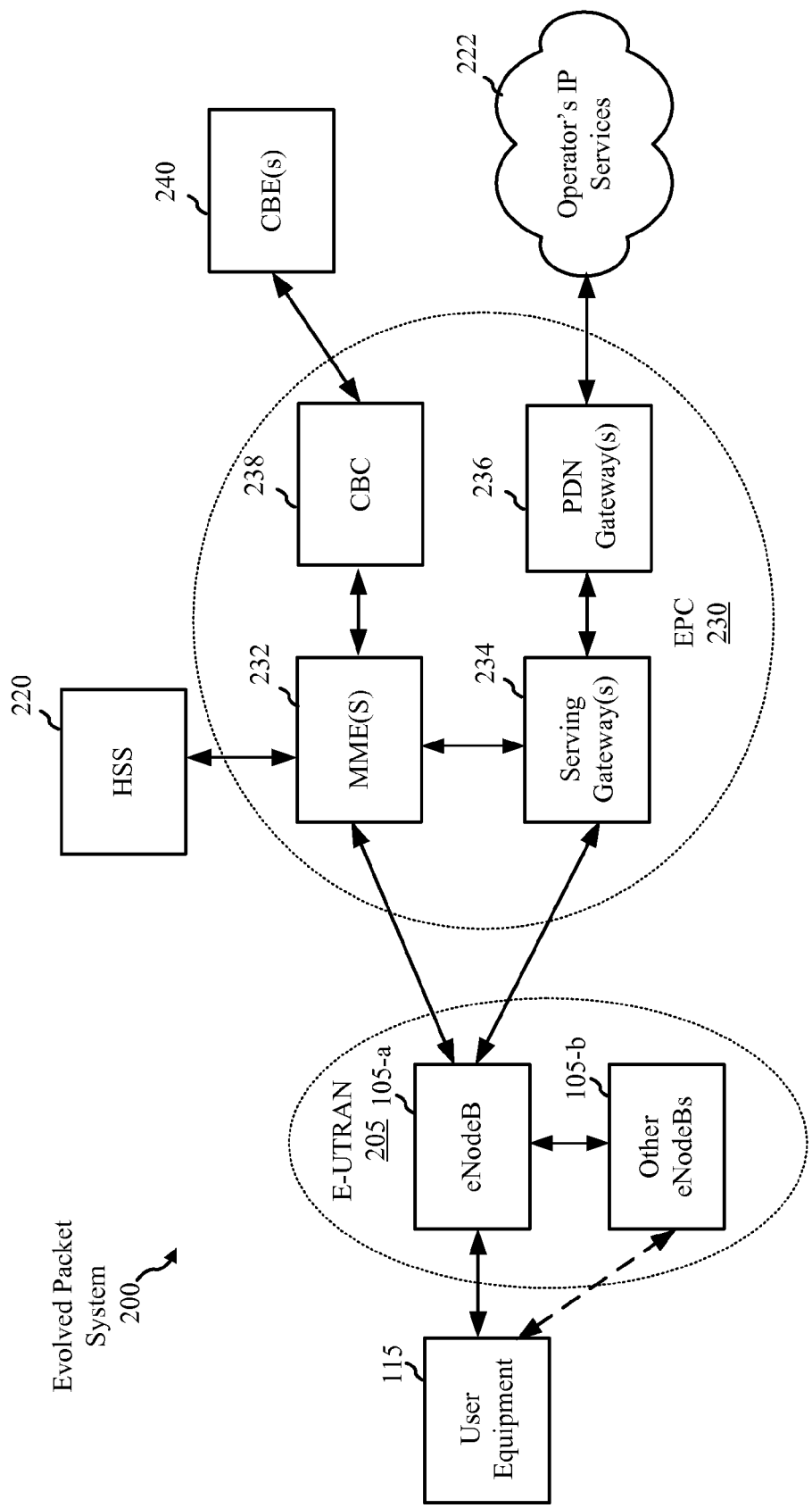
FIG. 2 is a block diagram illustrating an LTE/LTE-A network architecture in accordance with aspects of the present disclosure.

FIG. 2 is a block diagram illustrating an LTE/LTE-A network architecture 200 in accordance with aspects of the present disclosure. The LTE/LTE-A network architecture 200 provides a more detailed example of how the wireless communications system 100 shown in FIG. 1 may be embodied. The LTE/LTE-A network architecture 200 may be referred to as an Evolved Packet System (EPS). The LTE/LTE-A network architecture 200 may include one or more UEs 115, an Evolved UMTS Terrestrial Radio Access Network (E-UTRAN) 205, an Evolved Packet Core (EPC) 230, a Home Subscriber Server (HSS) 220, and an Operator's IP Services 222. The LTE/LTE-A network architecture 200 may interconnect with other access networks, but for simplicity those entities/interfaces are not shown. As shown, the LTE/LTE-A network architecture 200 provides packet-switched services, however, as those skilled in the art will readily appreciate, the various concepts presented throughout this disclosure may be extended to networks providing circuit-switched services.

The E-UTRAN 205 may include a base station 105-*a* and other base stations 105-*b*. The base station 105-*a* may provide user and control plane protocol terminations toward the UE 115. The base station 105-*a* may be connected to the other base stations 105-*b* via an X2 interface (e.g., backhaul) 132 (shown in FIG. 1). The base station 105-*a* may provide an access point to the EPC 230 for the UE 115. The base station 105-*a* may be connected by an S1 interface to the EPC 230. The EPC 230 may include one or more Mobility Management Entities (MMES) 232, one or more Serving Gateways 234, and one or more Packet Data Network (PDN) Gateways 236. The MME 232 may be the control node that processes the signaling between the UE 115 and the EPC 230. For example, the MME 232 may provide bearer and connection management. All user IP packets may be transferred through the Serving Gateway 234, which itself may be connected to the PDN Gateway 236. The PDN Gateway 236 may provide UE IP address allocation as well as other functions. The PDN Gateway 236 may be connected to the Operator's IP Services 222. The Operator's IP Services 222 may include the Internet, the Intranet, an IP Multimedia Subsystem (IMS), and a Packet-Switched (PS) Streaming Service (PSS).

The UE 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations and/or multiple antennas on the UE 115 to take advantage of multipath environments to transmit multiple data streams. CoMP includes techniques for dynamic coordination of transmission and reception by a number of eNBs to improve overall transmission quality for UEs as well as increasing network and spectrum utilization.

In accordance with some examples of the LTE/LTE-A network architecture 200, the EPC 230 may further include a Cell Emergency broadcast Center (CBC) 238 connected to some or all of the MME(s) 232. The CBC 238 receives CBS messages such as ETWS and CMAS notifications from a number of Central Emergency broadcast Entities (CBEs) 240. The CBEs 240 may originate and format the CBS messages. The CBC 238 determines how to emergency broadcast the CBS messages and initiates the emergency broadcast by sending the CBS messages to the MMEs 232. The MMEs 232, in turn, schedule CBS message emergency broadcasts and request or command a number of base stations 105-*a* to emergency broadcast the CBS messages.

Communication processes between two interacting nodes (e.g., UEs 115, base stations 105, MMEs 232, etc.) of the wireless communications system 100 shown in FIG. 1, or the LTE/LTE-A network architecture 200 shown in FIG. 2, may be conveniently described by a protocol stack. A protocol stack may be a layered decomposition model of the communication process between two peer entities. In this model, processes related to the physical aspects of communication (e.g., the physical layer) appear as lower layers in the protocol stack and processes related to the user aspects (e.g., the application layer) appear as upper layers in the protocol stack. The lower layers provide services to the upper layers.

Figure 3:
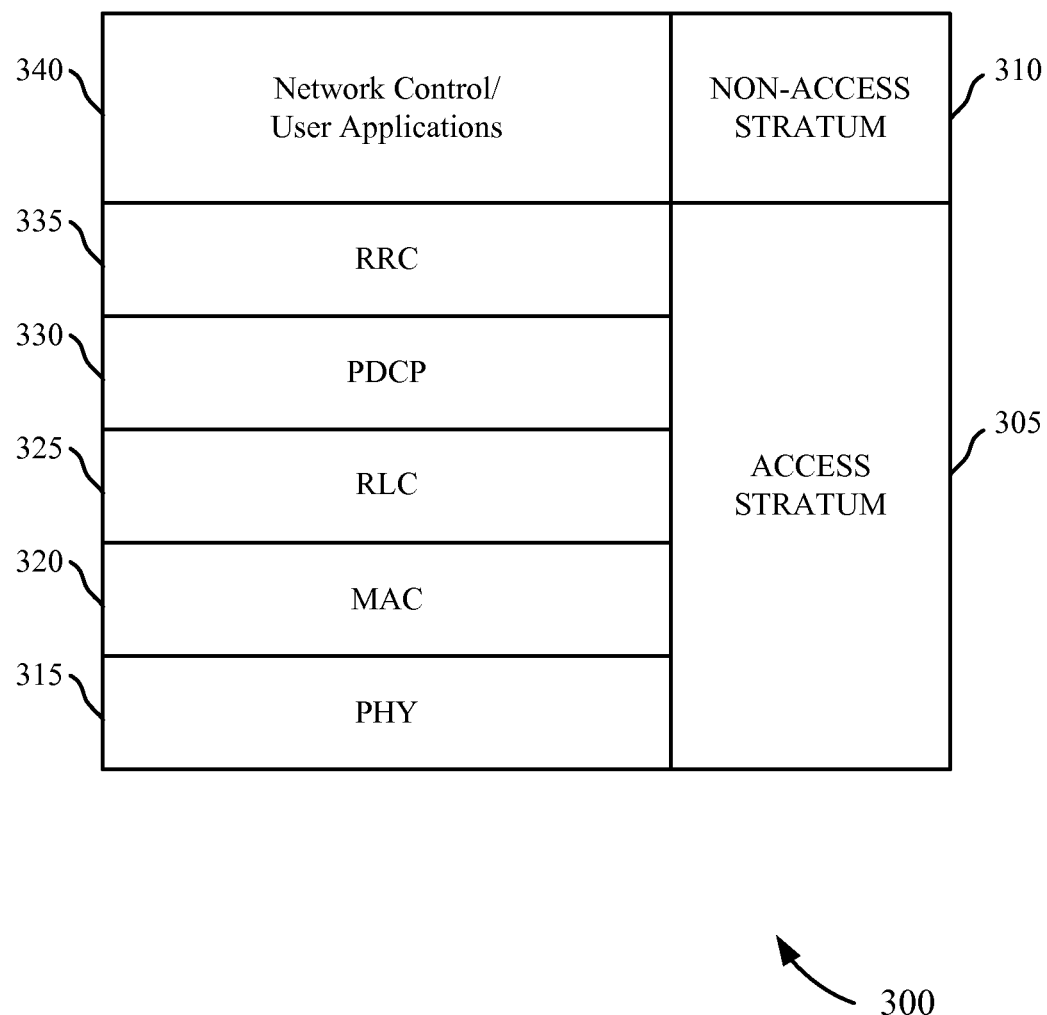
FIG. 3 illustrates an example of a GSM/UMTS/LTE/LTE-A radio control protocol stack in accordance with aspects of the present disclosure.

FIG. 3 illustrates an example of a GSM/UMTS/LTE/LTE-A radio control protocol stack 300 in accordance with aspects of the present disclosure. In one example, the GSM/UMTS/LTE/LTE-A radio control protocol stack 300 may be decomposed into two layers known as the access stratum 305 and the non-access stratum 310. The access stratum 305 provides communication access to end users and supports the transport services provided by the non-access stratum 310 to the core network 130. In one aspect, the access stratum 305 represents the lower part of the UMTS protocol stack for wireless interface functions and includes the Physical (PHY) layer 315, Medium Access Control (MAC) layer 320, Radio Link Control (RLC) layer 325, Packet Data Convergence Protocol (PDCP) layer 330, and Radio Resource Control (RRC) layer 335.

In one aspect, a stratum may be defined as the grouping of protocols related to certain communication services provided by a node. In one example, the access stratum 305 may include entities which affect user access to the wireless communications system, such as: physical layer aspects (modulation, coding, spreading, etc.), medium access (MAC) layer aspects, radio link control (RLC) aspects, etc. In contrast, the non-access stratum 310 may include entities which affect user to user communications, independent of the access method (e.g., network control/user applications 340 such as file transfer protocol (FTP), voice over IP (VoIP), etc.).

In a GSM/UMTS network, CBS messages (e.g., ETWS and CMAS notifications) may be transmitted in the non-access stratum 310 of the GSM/UMTS/LTE/LTE-A radio control protocol stack 300. The CBS messages (e.g., ETWS and CMAS notifications) transmitted in the non-access stratum 310 may be associated with message lengths. In an LTE/LTE-A network, however, CBS messages may be transmitted in the access stratum 305. In the access stratum 305, a message length may be not provided. Thus, even when it is determined that a message is a duplicate, the entire message may still be received. Otherwise, a UE 115 may not know when to prepare to receive a next message.

Figure 4A:
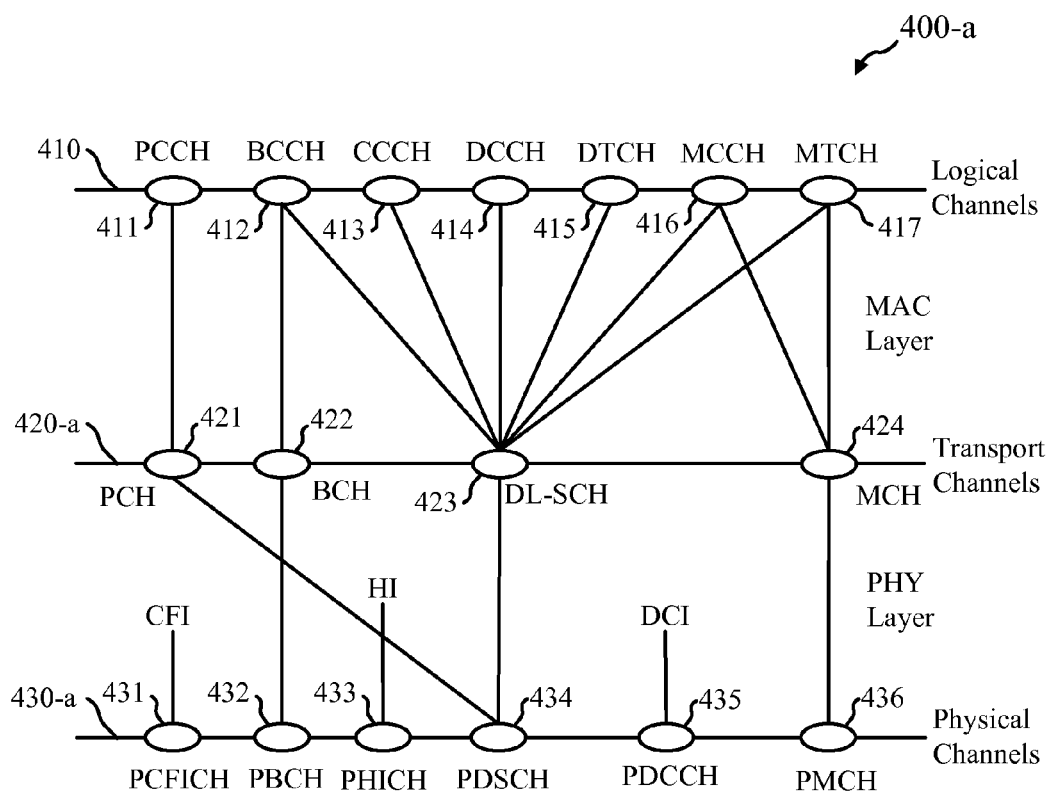
FIG. 4A and FIG. 4B illustrate channelization hierarchy that may be used by the wireless communications systems and/or network architecture in accordance with aspects of the present disclosure.
Figure 4B:
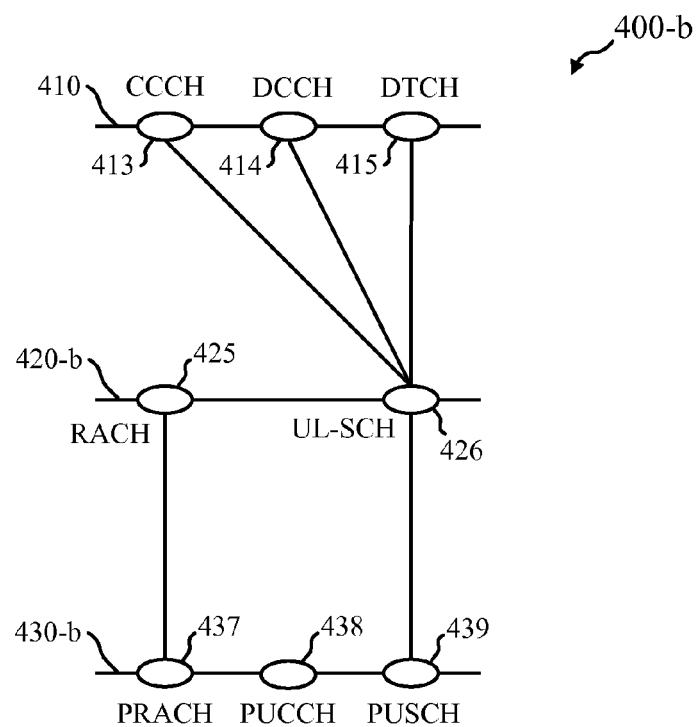

FIG. 4A and FIG. 4B illustrate channelization hierarchy that may be used by the wireless communications system 100 and/or network architecture 200 in accordance with aspects of the present disclosure. Downlink channelization hierarchy 400-*a* may illustrate, for example, channel mapping between logical channels 410, downlink transport channels 420-*a*, and downlink physical channels 430-*a* of an LTE/LTE-A network. Logical channels 410 may be classified into Control Channels and Traffic Channels. Logical control channels may include a paging control channel (PCCH) 411, which may be the downlink channel that transfers paging information, a emergency broadcast control channel (BCCH) 412, which may be the downlink channel for emergency broadcasting system control information, and a multicast control channel (MCCH) 416, which may be a point-to-multipoint downlink channel used for transmitting multimedia emergency broadcast and multicast service (MBMS) scheduling and control information for one or several multicast traffic channels (MTCHs) 417.

For example, after establishing radio resource control (RRC) connection, MCCH may be used by the user equipments that receive MBMS. Dedicated control channel (DCCH) 414 may be another logical control channel that is a point-to-point bi-directional channel transmitting dedicated control information, such as user-specific control information used by the user equipment having an RRC connection. Common control channel (CCCH) 413 may also be a logical control channel that may be used for random access information. Logical traffic channels may comprise a dedicated traffic channel (DTCH) 415, which may be a point-to-point bi-directional channel dedicated to one user equipment for the transfer of user information and a MTCH 417, which may be used for point-to-multipoint downlink transmission of traffic data.

The communication networks that accommodate some of the various examples may additionally include logical transport channels that may be classified into downlink (DL) and uplink (UL). The DL transport channels 420-*a* may include an emergency broadcast channel (BCH) 422, a downlink shared data channel (DL-SCH) 423, a multicast channel (MCH) 424 and a Paging Channel (PCH) 421.

The physical channels may also include a set of downlink and uplink channels. In some disclosed examples, the downlink physical channels 430-*a* may include a physical emergency broadcast channel (PBCH) 432, a physical control format indicator channel (PCFICH) 431, a physical downlink control channel (PDCCH) 435, a physical hybrid ARQ indicator channel (PHICH) 433, a physical downlink shared channel (PDSCH) 434 and a physical multicast channel (PMCH) 436.

Uplink channelization hierarchy 400-*b* may illustrate, for example, channel mapping between logical channels 410, UL transport channels 420-*b*, and UL physical channels 430-*b* for an LTE/LTE-A network. The UL transport channels 420-*b* may include a random access channel (RACH) 425, and an UL shared data channel (UL-SCH) 426. The UL physical channels 430-*b* may include at least one of a physical random access channel (PRACH) 437, a physical UL control channel (PUCCH) 438, and a physical UL shared channel (PUSCH) 439.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which may be referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

In an LTE/LTE-A network, CBS messages such as ETWS and CMAS notifications may be emergency broadcast over BCCH 412, DL-SCH 423, and PDSCH 434. More particularly, ETWS and CMAS notifications may be emergency broadcast over these channels as a part of the network's system information. A UE 115 may be made aware of the existence of ETWS and/or CMAS notifications by receipt of a paging message transmitted over PCCH 411, PCH 421, and PDSCH 434. The paging message may include an etws-indication or a cmas-indication.

Figure 5:
FIG. 5 illustrates a partial list of System Information Blocks (SIBs) that may be used in a GSM/UTMS or LTE/LTE-A network to transmit system information in accordance with aspects of the present disclosure.

FIG. 5 illustrates a partial list 500 of System Information Blocks (SIBs) that may be used in a GSM/UTMS or LTE/LTE-A network to transmit system information in accordance with aspects of the present disclosure. SIB1 provides, among other things, cell access information and information about the time-domain scheduling of other SIBs. SIB10 and SIB 11 provide ETWS information. SIB12 may provide CMAS information. A UE 115 may receive a paging message including an etws-indication or a cmas-indication at any time, and may thereafter begin or continue receiving SIB1, SIB10, SIB11, and/or SIB12.

SIBs may be mapped to System-Information messages (SIs) which correspond to transport blocks to be transmitted over DL-SCH 423 (as shown in FIG. 4). Different SIBs may be mapped to the same or different SIs. Information regarding SIB to SI mapping may be transmitted to a UE 115 in SIB1.

Figure 6:
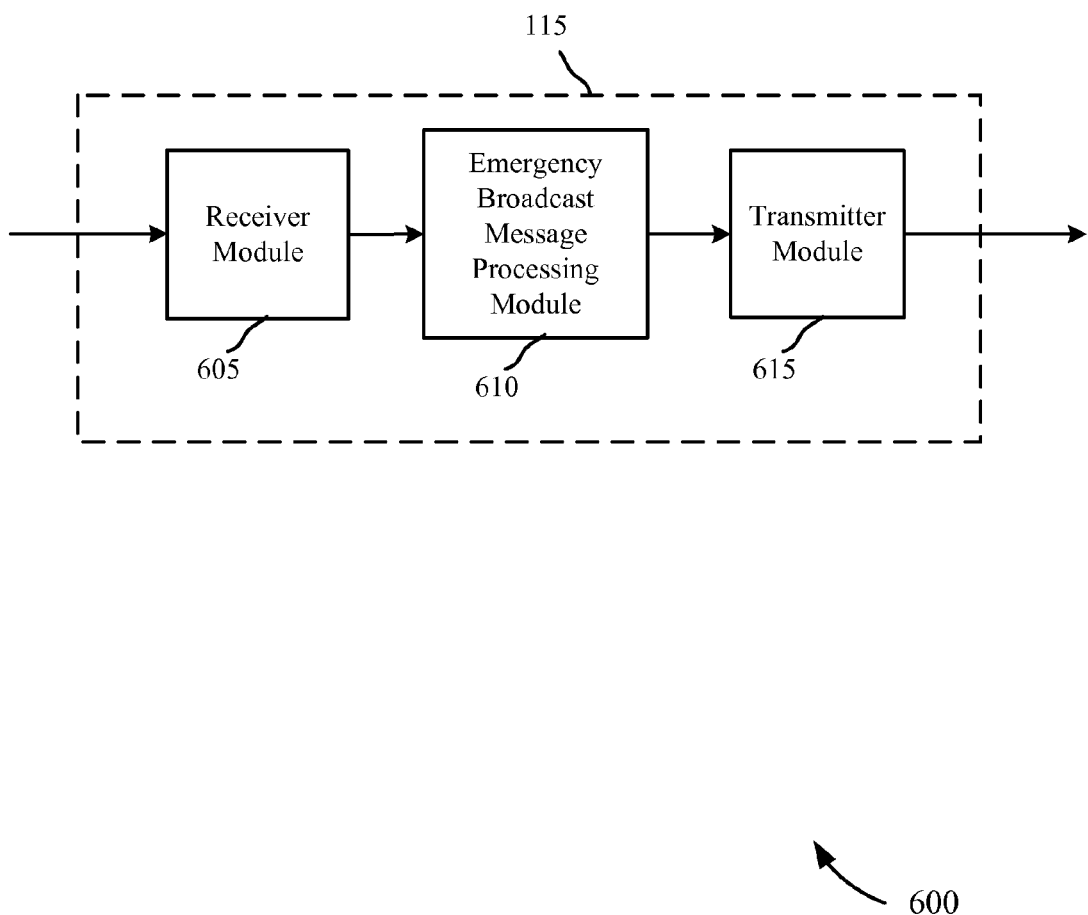
FIG. 6 is a block diagram illustrating one example of a UE that enables power conservation in a wireless communications system in accordance with aspects of the present disclosure.

FIG. 6 is a block diagram 600 illustrating one example of a UE 115 that enables power conservation in a wireless communications system 100 in accordance with various examples. The UE 115 may be an example of the UEs 115 described with reference to FIG. 1 or FIG. 2. The UE 115 may include a receiver module 605, an emergency broadcast message processing module 610, and/or a transmitter module 615. Each of these components may be in communication with each other.

These components of the UE 115 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 605 may include a cellular receiver capable of receiving messages over any of the DL channels shown in FIG. 4A. The receiver module 605 may in some cases receive segments of a emergency broadcast message in an access stratum 305, such as segments of ETWS or CMAS notifications received over BCCH 412, DL-SCH 423, and PDSCH 434 (as shown in FIG. 4). The transmitter module 615 may include a cellular transmitter capable of transmitting messages over any of the UL channels shown in FIG. 4B. In some examples, the receiver module 605 and the transmitter module 615 may be combined in a transceiver module. The emergency broadcast message processing module 610 may process, for example, emergency broadcast messages such as CBS messages (including ETWS and CMAS notifications).

Figure 7:
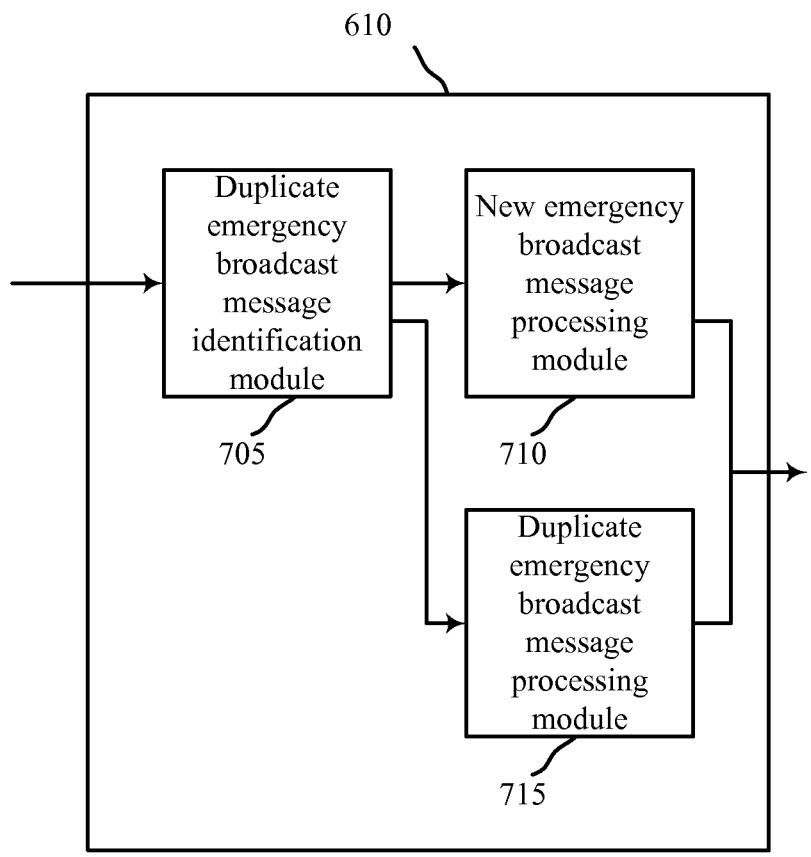
FIG. 7 is a block diagram of an emergency broadcast message processing module including one or more of a duplicate emergency broadcast message identification module, a new emergency broadcast message processing module, and/or a duplicate emergency broadcast message processing module in accordance with aspects of the present disclosure.
Figure 8:
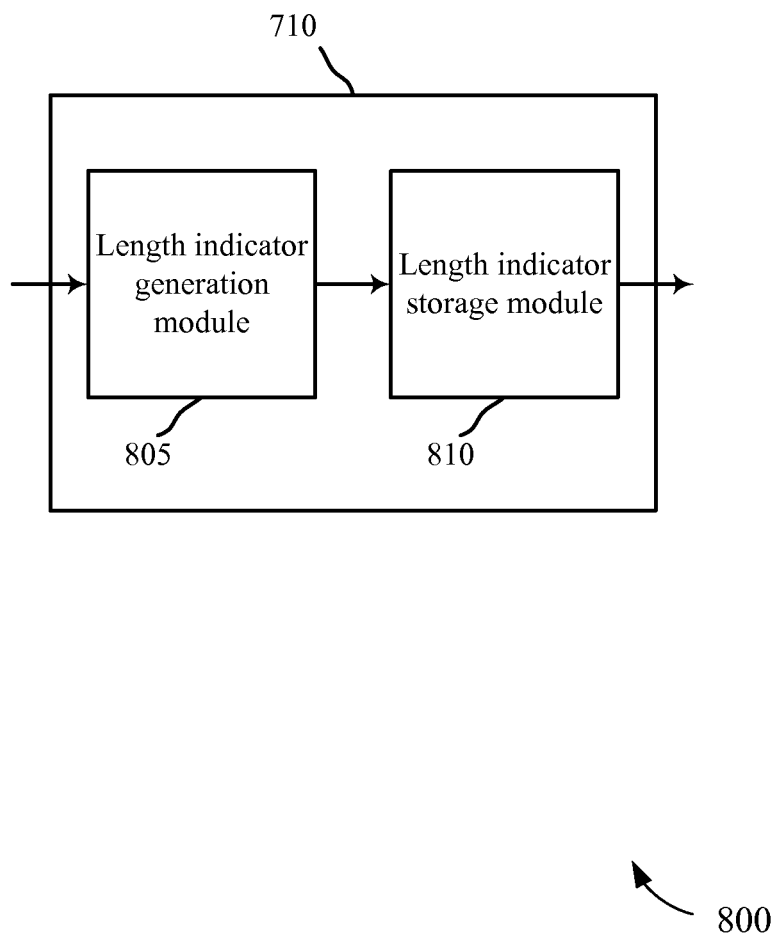
FIG. 8 is a block diagram of a new emergency broadcast message processing module including one or more of a length indicator generation module and/or a length indicator storage module in accordance with aspects of the present disclosure.
Figure 9:
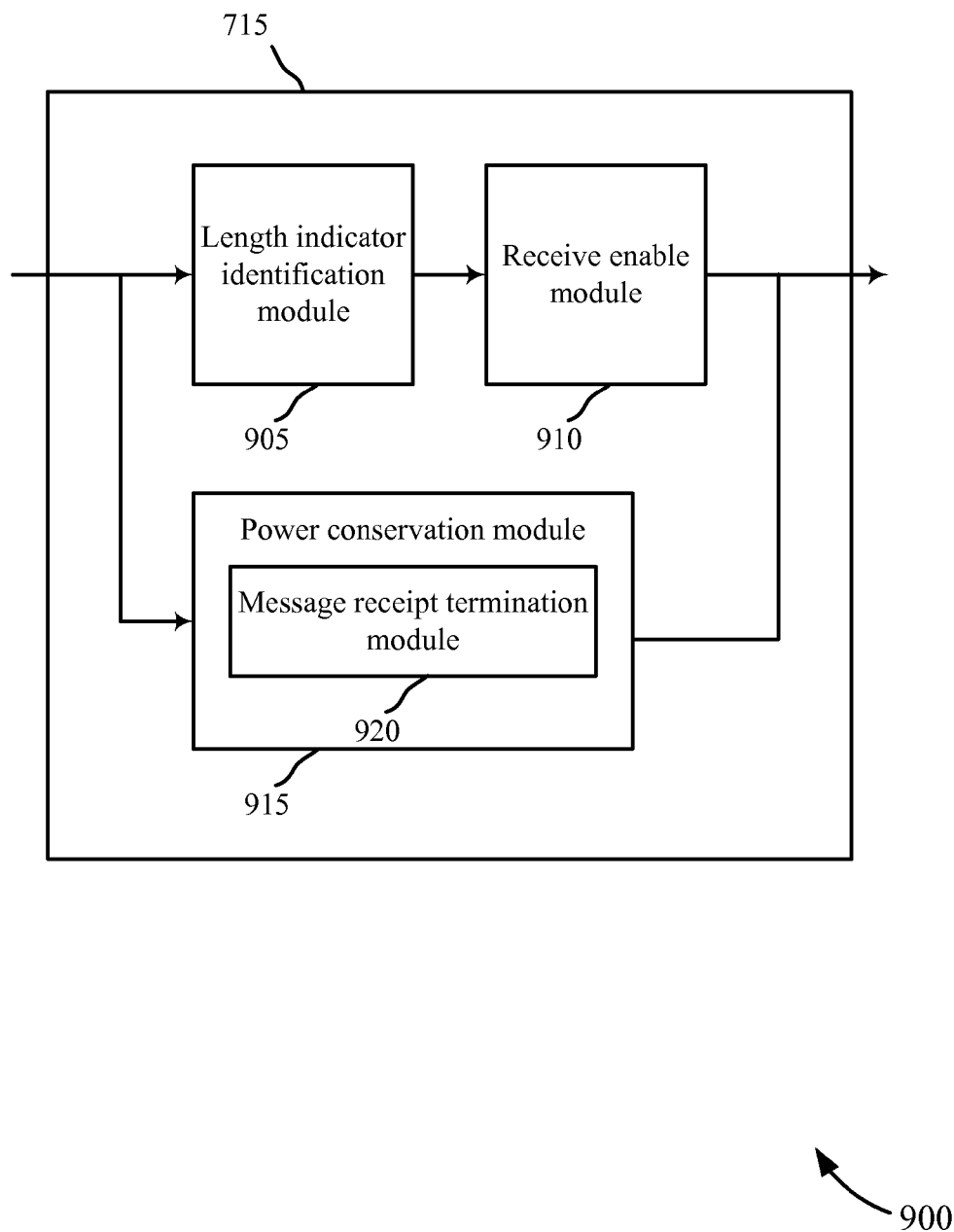
FIG. 9 is a block diagram of a duplicate emergency broadcast message processing module including one or more of a length indicator identification module, a receive enable module, and/or a power conservation module in accordance with aspects of the present disclosure.

FIGS. 7-9 illustrate more detailed examples of how the emergency broadcast message processing module 610 shown in FIG. 6 may be embodied in accordance with aspects of the present disclosure. More particularly, FIG. 7 is a block diagram 700 of an emergency broadcast message processing module 610 including one or more of a duplicate emergency broadcast message identification module 705, a new emergency broadcast message processing module 710, and/or a duplicate emergency broadcast message processing module 715. The emergency broadcast message processing module 610 may be an example of the emergency broadcast message processing module 610 described in FIG. 6.

The duplicate emergency broadcast message identification module 705 may be used, for example, to determine whether a first emergency broadcast message is a duplicate emergency broadcast message. A duplicate emergency broadcast message may be identified based at least in part on one or more identifiers of one or more message segments ("segments") of the emergency broadcast message. For example, ETWS and CMAS notifications may include a message identifier having a serial number. A duplicate ETWS or CMAS message may be identified when the serial number associated with the message identifier of the first (new) emergency broadcast message matches the serial number of a second emergency broadcast message.

When the duplicate emergency broadcast message identification module 705 does not identify a duplicate emergency broadcast message, the first emergency broadcast message may be passed to the new emergency broadcast message processing module 710 for processing. When the duplicate emergency broadcast message identification module 705 does identify a duplicate emergency broadcast message, the first emergency broadcast message may be passed to the duplicate emergency broadcast message processing module 715.

FIG. 8 is a block diagram 800 of a new emergency broadcast message processing module 710 including one or more of a length indicator generation module 805 and/or a length indicator storage module 810. The new emergency broadcast message processing module 710 may be an example of the new emergency broadcast message processing module 710 described in FIG. 7.

The length indicator generation module 805 determines the length of the first emergency broadcast message. The generated length of the first emergency broadcast message may indicate a number of message segments in the first emergency broadcast message, a time taken to receive the first emergency broadcast message, a number of bits or bytes in the first emergency broadcast message, etc. The length indicator storage module 810 stores the generated length along with an index, such as the message identifier and/or serial number of the first emergency broadcast message.

FIG. 9 is a block diagram 900 of a duplicate emergency broadcast message processing module 715 including one or more of a length indicator identification module 905, a receive enable module 910, and/or a power conservation module 915. The power conservation module 915 may include a message receipt termination module 920. The duplicate emergency broadcast message processing module 715 may be an example of the duplicate emergency broadcast message processing module 715 described in FIG. 7.

As shown, the length indicator identification module 905 and power conservation module 915 may operate in parallel. Upon the first emergency broadcast message being identified as a duplicate emergency broadcast message, the length indicator identification module 905 identifies the length of the first/duplicate emergency broadcast message. This may be done by identifying a number of segments used to assemble a second emergency broadcast message, which may be done by using the one or more identifiers of the received one or more segments and/or serial number of the duplicate emergency broadcast message to retrieve the number of segments in a second emergency broadcast message from the length indicator storage module 810.

The receive enable module 910 receives the length indicator identified by the length indicator identification module 905 and uses it to determine 1) a time period during which emergency broadcast message segments will not be received, and 2) a time, following the time period in which emergency broadcast message segments will not be received, at which the reception of emergency broadcast messages will resume. The time period during which emergency broadcast message segments will not be received may correspond to the number of segments used to assemble the second emergency broadcast message, but in some cases may differ from the time needed to receive the number of segments (i.e., the time during which emergency broadcast message segments will not be received may be equal to, less than, or greater than the time needed to receive the number of segments in the duplicate emergency broadcast message). In some examples, resuming reception of emergency broadcast messages may include resuming reception of a SIB used to emergency broadcast segments of the emergency broadcast messages.

The power conservation module 915 includes a message receipt termination module 920 that, upon the first emergency broadcast message being identified as a duplicate emergency broadcast message, terminates the receipt of additional segments of the first emergency broadcast message (e.g., terminates the receipt of a SIB used to emergency broadcast segments of the first emergency broadcast message). This enables the power conservation module 915 to power down UE 115 components that are powered up for the purpose of receiving the remaining segments of the first emergency broadcast message. Alternately, the power conservation module 915 may re-allocate the unused UE 115 components for other purposes, thereby improving the efficiency of the UE 115 in performing other tasks.

Figure 10:
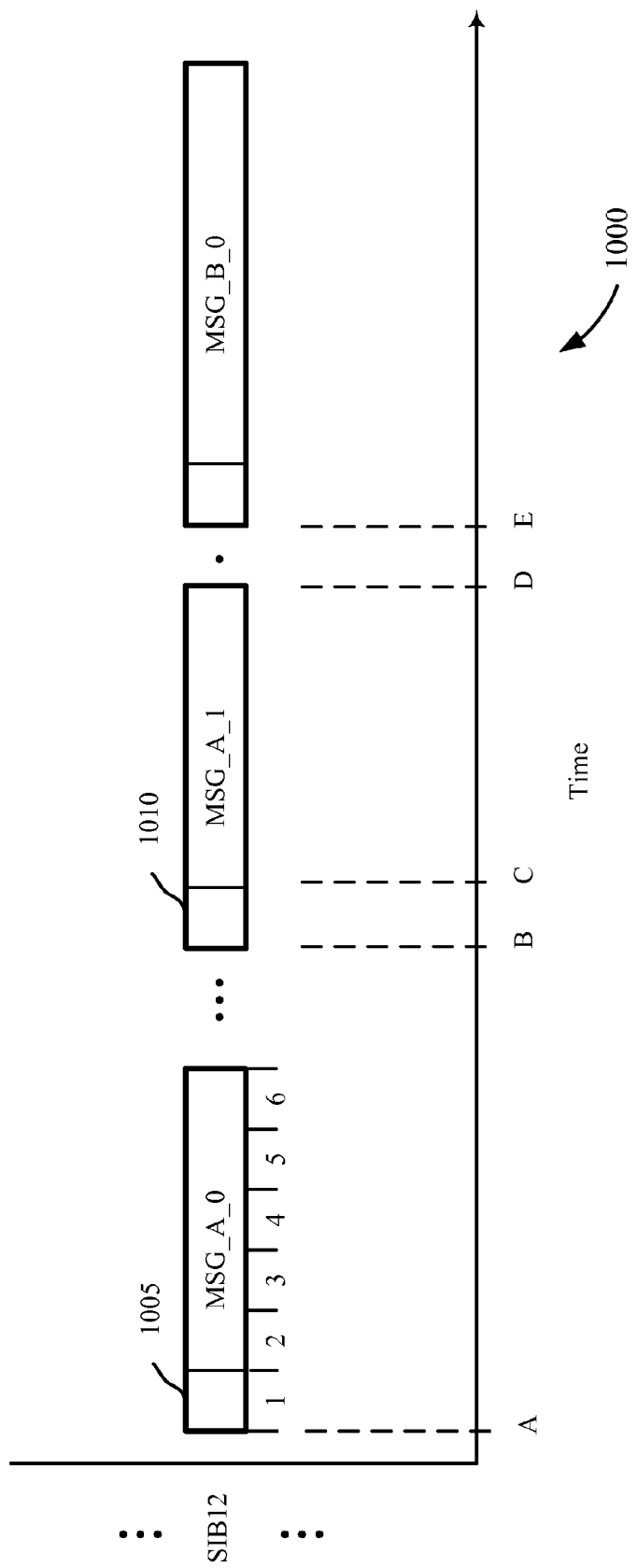
FIG. 10 is a timing diagram illustrating receipt of a number of CMAS notifications in SIB12, in accordance with a first CMAS notification scenario in accordance with aspects of the present disclosure.

FIG. 10 is a timing diagram 1000 illustrating receipt of a number of CMAS notifications in SIB12, in accordance with a first CMAS notification scenario in accordance with aspects of the present disclosure. The CMAS notification scenario may occur, for example, in the wireless communications system 100 or 200 described in FIG. 1 or 2.

At a time "A", following the receipt of a paging message containing a cmas-indication, a "new" notification identified as MSG_A_0 is received. The notification may include a number of segments and a header 1005. Although the segments are shown to be contiguous in time, they need not be. Because the header 1005 does not indicate the notification's length, an emergency broadcast message processing module 610 as shown in FIG. 6, a length indicator generation module 805 as shown in FIG. 8, or some other component of a UE 115, may maintain the number of segments in the notification as the notification is received. Upon receiving the last segment in the notification, the number of segments may be stored with an identifier of the notification (e.g., a message identifier and/or serial number). The number of segments may be stored, in some examples, by the length indicator storage module 810 shown in FIG. 8. The number of segments may be stored in flash memory, random access memory, or any other type of memory, buffer, or physical storage element.

At a time "B", a "duplicate" notification identified as MSG_A_1 is received. However, after decoding the notification's header 1010, it may be determined by a UE component, such as the duplicate emergency broadcast message identification module 705 shown in FIG. 7, that the notification MSG_A_1 is a duplicate notification. Receipt of the duplicate notification's segments may be terminated at time "C". Termination of receipt may be triggered, in some cases, by the message receipt termination module 920 shown in FIG. 9. The time period during which SIB12 message segments will not be received may be determined, in some cases, by the length indicator identification module 905 and receive enable module 910 shown in FIG. 9.

Following the time period during which SIB12 message segments are not received, and at time "D", the reception of additional notifications resumes. At time "E", a "new" notification identified as MSG_B_0 may be received, and the notification may be processed similarly to MSG_A_0.

The techniques for receiving CMAS notifications described in FIG. 10 may be applied to the receipt of other types of emergency broadcast messages, including, for example, ETWS notifications received in SIB 10 or SIB 11.

Figure 11:
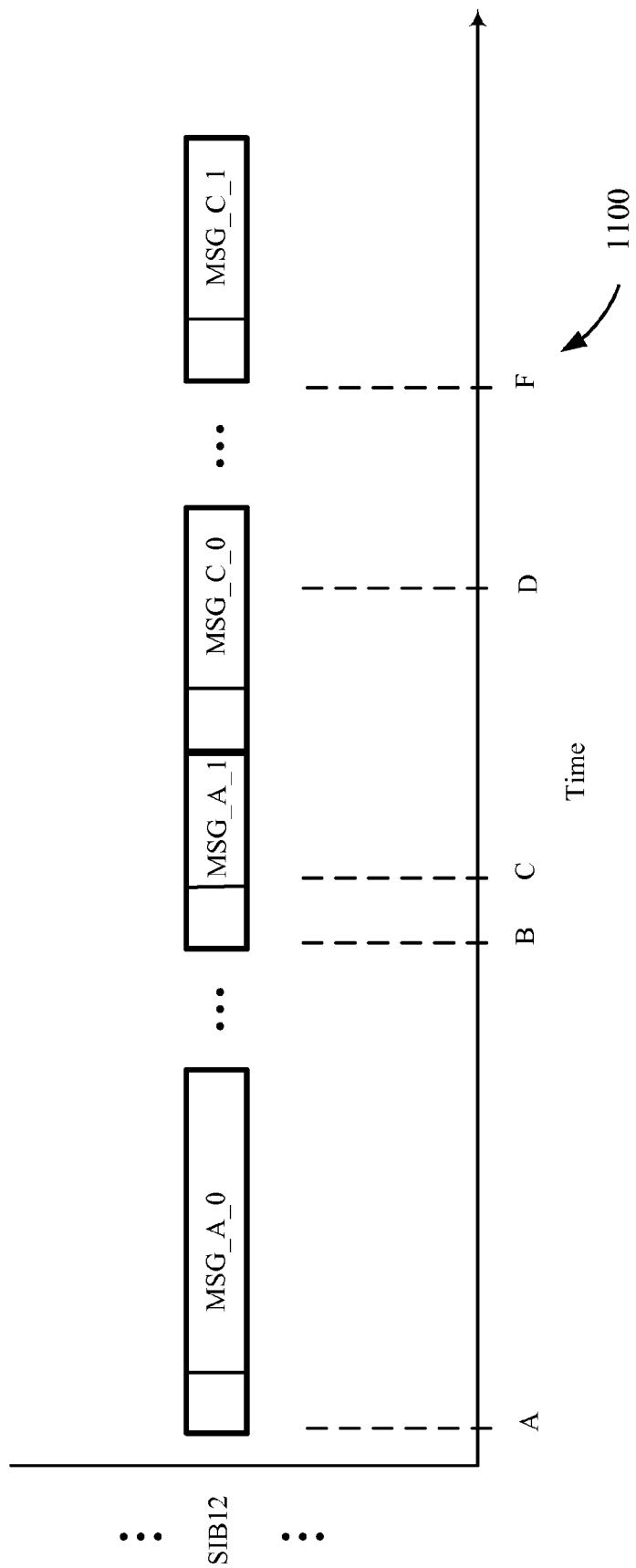
FIG. 11 is another timing diagram illustrating receipt of a number of CMAS notifications in SIB12, in accordance with a second CMAS notification scenario in accordance with aspects of the present disclosure.

FIG. 11 is another timing diagram 1100 illustrating receipt of a number of CMAS notifications in SIB12, in accordance with a second CMAS notification scenario in accordance with aspects of the present disclosure. The CMAS notification scenario may occur, for example, in the wireless communications system 100 or 200 described in FIG. 1 or 2.

The scenario begins similarly to the scenario shown in FIG. 10, with receipt of a new CMAS notification (MSG_A_0) at time "A"; receipt of a duplicate CMAS notification (MSG_A_1) at time "B"; the termination of CMAS notification reception at time "C"; and the resumption of CMAS notification receipt at time "D". However, during the time period in which the UE 115 was not receiving message segments, the MSG_A_1 was terminated and part of a new notification (MSG_C_0) was received. Thus, the MSG_C_0 may not have been received correctly. Although the notification may not be reconstructed, the UE 115 may remain in a "receive enabled" state following time "D", such that a rebroadcast of the missed notification (i.e., MSG_C_1) may be received at time "F".

The techniques for receiving CMAS notifications described in FIG. 11 may be applied to the receipt of other types of emergency broadcast messages, including, for example, ETWS notifications received in SIB 10 or SIB 11.

Figure 12:
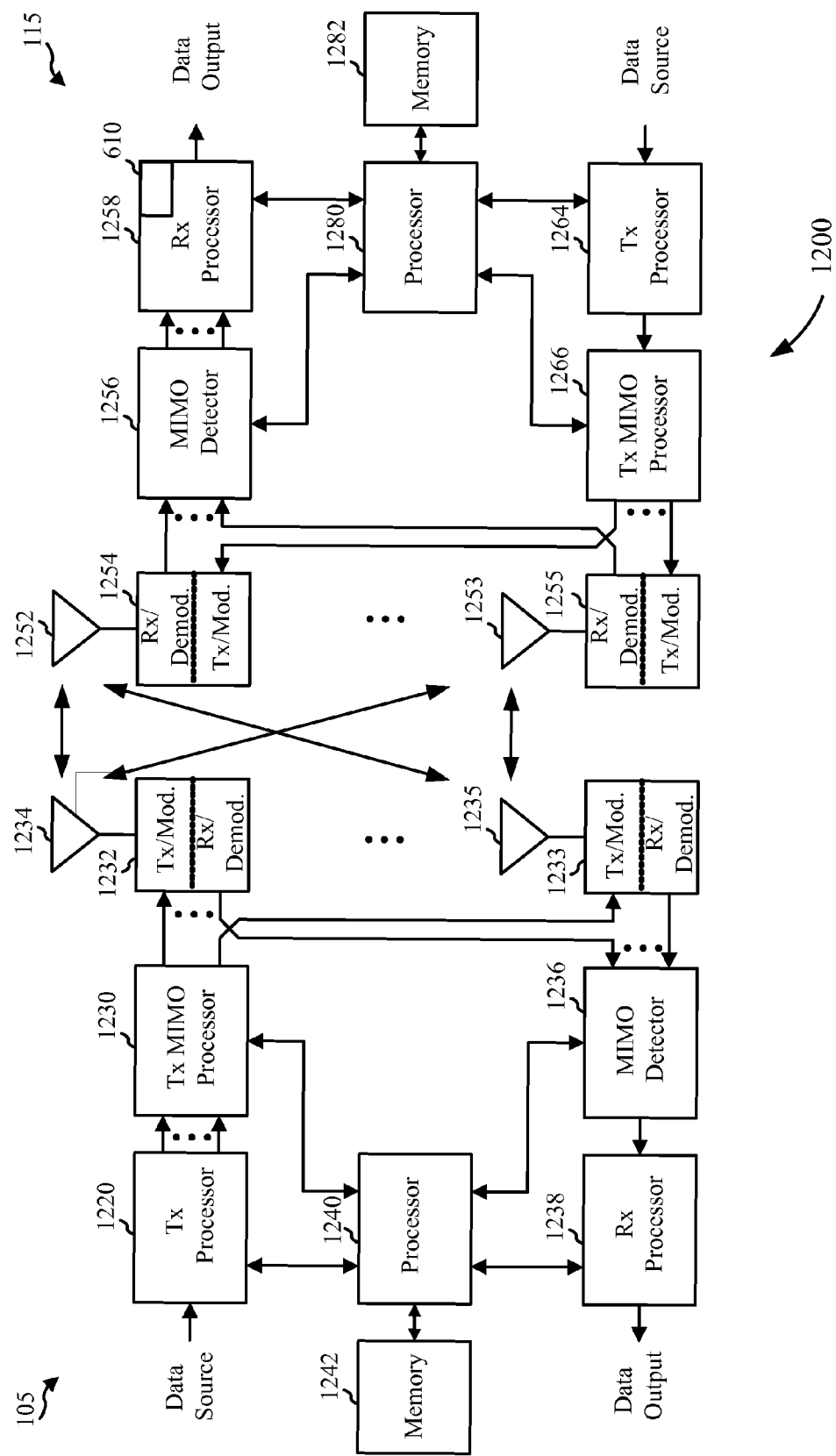
FIG. 12 is a block diagram of a MIMO communication system including a base station and a UE in accordance with aspects of the present disclosure.

FIG. 12 is a block diagram of a MIMO communication system 1200 including a base station 105 and a UE 115 in accordance with aspects of the present disclosure. The base station 105 may be an example of the base station 105 illustrated in FIG. 1 or 2. The UE 115 may be an example of the UE 115 illustrated in FIG. 1, 2, or 6. Further, this MIMO communication system 1200 may illustrate aspects of the wireless communications system 100 of FIG. 1 and/or LTE/LTE-A network architecture 200 of FIG. 2. The base station 105 may be equipped with base station antennas 1234 and 1235, and the UE 115 may be equipped with UE antennas 1252 and 1253. In the MIMO communication system 1200, the base station 105 may be able to send data over multiple communication links at the same time. Each communication link may be called a "layer" and the "rank" of the communication link may indicate the number of layers used for communication. For example, in a 2×2 MIMO system where base station 105 transmits two "layers," the rank of the communication link between the base station 105 and the UE 115 is two.

At the base station 105, a base station transmit processor 1220 may receive data from a data source. The base station transmit processor 1220 may process the data. The base station transmit processor 1220 may also generate reference symbols, and a cell-specific reference signal. A base station transmit (TX) MIMO processor 1230 may perform spatial processing (e.g., precoding) on data symbols, control symbols, and/or reference symbols, if applicable, and may provide output symbol streams to the base station transmit modulators 1232 and 1233. Each base station transmit modulator may process a respective output symbol stream (e.g., for OFDM, etc.) to obtain an output sample stream. Each base station transmit modulator 1232 and 1233 may further process (e.g., convert to analog, amplify, filter, and upconvert) the output sample stream to obtain a downlink (DL) signal. In one example, DL signals from base station transmit modulators 1232 or 1233 may be transmitted via the base station antennas 1234 and 1235, respectively. In some examples, a base station 105 may have more than two transmit modulators and antennas.

At the UE 115, the UE antennas 1252 and 1253 may receive the DL signals from the base station 105 and may provide the received signals to UE demodulators 1254 and 1255, respectively. Each UE demodulator 1254 and 1255 may condition (e.g., filter, amplify, downconvert, and digitize) a respective received signal to obtain input samples. Each UE demodulator 1254 and 1255 may further process the input samples (e.g., for OFDM, etc.) to obtain received symbols. A UE MIMO detector 1256 may obtain received symbols from all the UE demodulators 1254 and 1255, perform MIMO detection on the received symbols if applicable, and provide detected symbols. A UE receive processor 1258 may process (e.g., demodulate, deinterleave, and decode) the detected symbols, providing decoded data for the UE 115 to a data output, and provide decoded control information to a UE processor 1280, or UE memory 1282. An emergency broadcast message processing module 610 may form a part of the UE receive processor 1258, UE processor 1280, or other components of the UE 115, and in some cases may operate similarly to the emergency broadcast message processing module 610 described in FIG. 6 or 7. Upon detection of a duplicate emergency broadcast message, components of the UE 115 that may be placed in a power conservation mode or reallocated for other purposes include, but are not limited to, the UE demodulators 1254 and 1255, the UE MIMO detector 1256, the UE receive processor 1258, the UE processor 1280, and the UE memory 1282. In some examples, a UE may have more than two demodulators and antennas.

On the uplink (UL), at the UE 115, a UE transmit processor 1264 may receive and process data from a data source. The UE transmit processor 1264 may also generate reference symbols for a reference signal. The symbols from the UE transmit processor 1264 may be precoded by a UE transmit MIMO processor 1266 if applicable, further processed by the UE demodulators 1254 and 1255 (e.g., for SC-FDMA, etc.), and be transmitted to the base station 105 in accordance with the transmission parameters received from the base station 105. At the base station 105, the UL signals from the UE 115 may be received by the base station antennas 1234, processed by the base station transmit modulators 1232, detected by a base station MIMO detector 1236 if applicable, and further processed by a base station receive processor 1238. The base station receive processor 1238 may provide decoded data to a data output and to a base station processor 1240. The components of the UE 115 may, individually or collectively, be implemented with one or more Application Specific Integrated Circuits (ASICs) adapted to perform some or all of the applicable functions in hardware. Each of the noted modules may be a means for performing one or more functions related to operation of the MIMO communication system 1200. Similarly, the components of the base station 105 may, individually or collectively, be implemented with one or more Application Specific Integrated Circuits (ASICs) adapted to perform some or all of the applicable functions in hardware. Each of the noted components may be a means for performing one or more functions related to operation of the MIMO communication system 1200.

Figure 13:
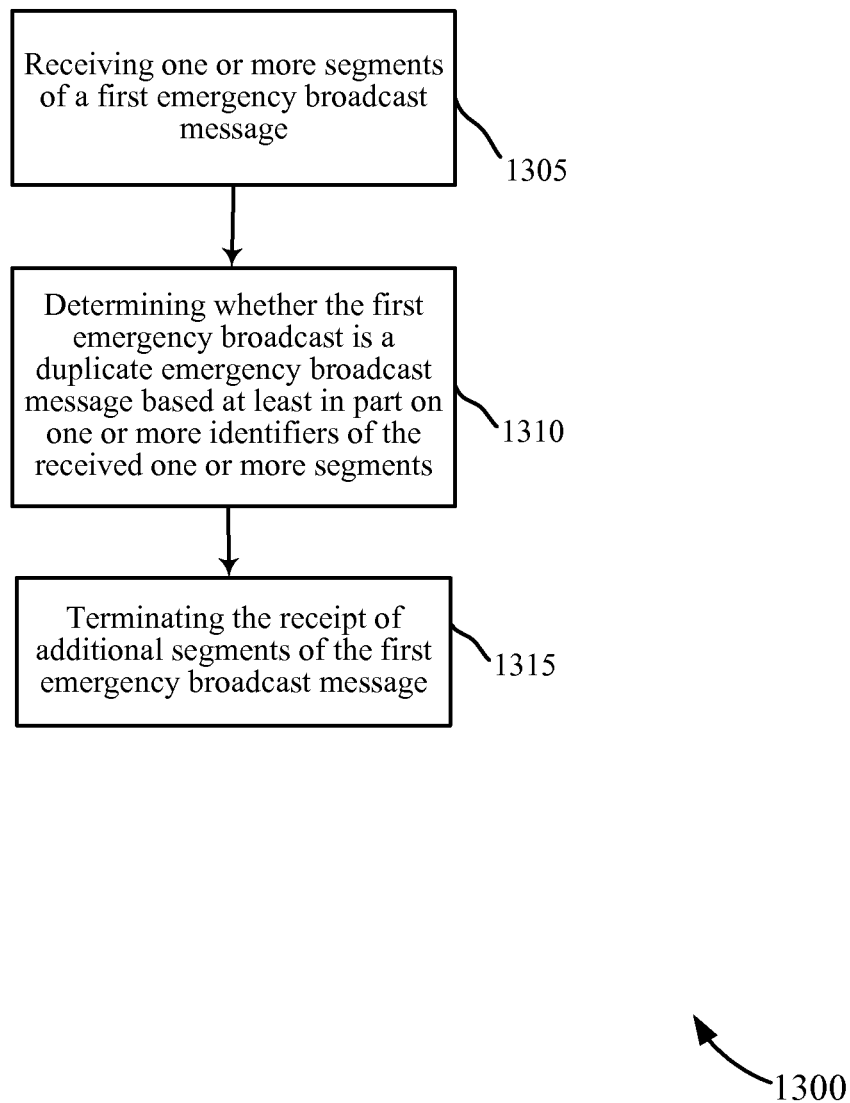
FIG. 13 is a flow chart illustrating one example of a method for emergency broadcast message reception in a wireless communications system in accordance with aspects of the present disclosure.

FIG. 13 is a flow chart illustrating one example of a method 1300 for emergency broadcast message reception in a wireless communications system in accordance with aspects of the present disclosure. For clarity, the method 1300 is described below with reference to one of the UEs 115 shown in FIG. 1, 2, 6 or 12. In one implementation, the emergency broadcast message processing module 610 may execute one or more sets of codes to control the functional elements of the UE 115 to perform the functions described below.

At block 1305, one or more segments of a first emergency broadcast message may be received in an access stratum. At block 1310, the first emergency broadcast message may be identified as a duplicate emergency broadcast message based at least in part on one or more identifiers of the received one or more segments. At block 1315, the receipt of additional segments of the first emergency broadcast message may be terminated.

Thus, the method 1300 may provide a way to conserve power in a wireless communications system. It should be noted that the method 1300 is just one implementation and that the operations of the method 1300 may be rearranged or otherwise modified such that other implementations are possible.

Figure 14:
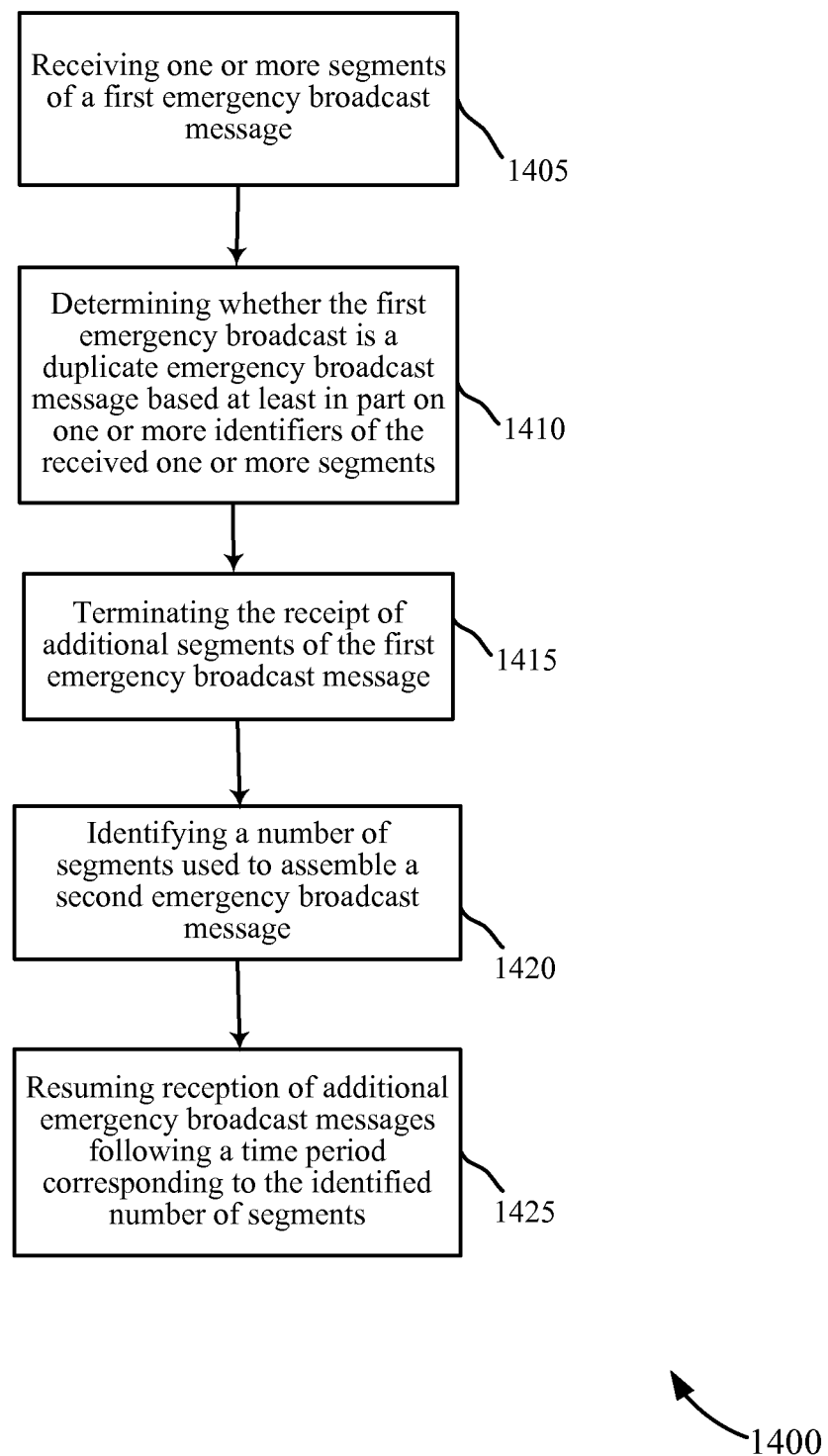
FIG. 14 is a flow chart illustrating one example of a more detailed implementation of the method shown in FIG. 13 in accordance with aspects of the present disclosure.

FIG. 14 is a flow chart illustrating one example 1400 of a more detailed implementation of the method 1300 shown in FIG. 13. For clarity, the method 1400 is described below with reference to one of the UEs 115 shown in FIG. 1, 2, 6, or 12. In one implementation, the emergency broadcast message processing module 610 may execute one or more sets of codes to control the functional elements of the UE 115 to perform the functions described below.

Blocks 1405, 1410, and 1415 of the method 1400 may be similar to respective blocks 1305, 1310, and 1315 described in FIG. 13. At block 1420, a number of segments used to assemble a second emergency broadcast message may be identified. The number of segments used to assemble the second emergency broadcast message may indicate a length of the first emergency broadcast message. In some examples, block 1420 may be performed in parallel with block 1415.

At block 1425, the reception of emergency broadcast messages may be resumed following a time period corresponding to the identified number of segments. In some examples, this may include resuming reception of a SIB used to emergency broadcast segments of the emergency broadcast messages.

Thus, the method 1400 may provide a way to conserve power in a wireless communications system. It should be noted that the method 1400 is just one implementation and that the operations of the method 1400 may be rearranged or otherwise modified such that other implementations are possible.

Figure 15:
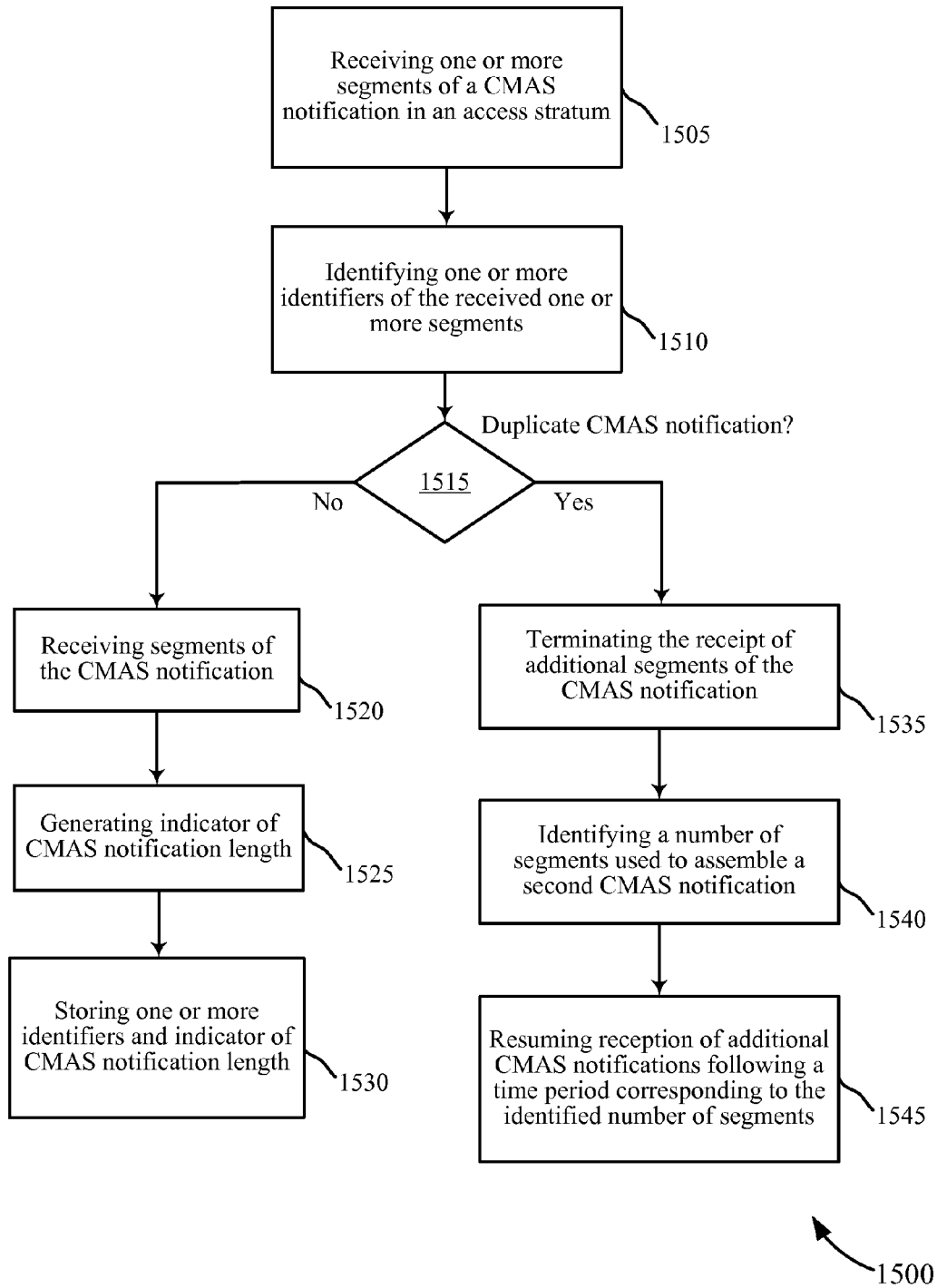
FIG. 15 is a flow chart illustrating one example of a more detailed implementation of the method shown in FIG. 13 in accordance with aspects of the present disclosure.

FIG. 15 is a flow chart illustrating one example 1500 of a more detailed implementation of the method 1300 shown in FIG. 13 in accordance with aspects of the present disclosure. For clarity, the method 1500 is described below with reference to one of the UEs 115 shown in FIG. 1, 2, or 12. In one implementation, the emergency broadcast message processing module 610 may execute one or more sets of codes to control the functional elements of the UE 115 to perform the functions described below.

At block 1505, one or more segments of a CMAS notification may be received in an access stratum 305. Alternatively, ETWS notifications or other warning notifications may be received.

At block 1510, one or more identifiers of the received one or more segments may be identified. In some examples, the identifiers may be identified from one or more segments of a notification header and may include a message identifier such as a serial number.

At block 1515, it may be determined from the identifiers (and possibly other information) whether the CMAS notification is a duplicate. This may be done by comparing the one or more identifiers of the received segments with identifiers of second notifications, which identifiers of second notifications have been stored.

When the CMAS notification is not a duplicate notification, segments of the CMAS notification may be received at block 1520. An indicator of the CMAS notification length may be generated at block 1525. The indicator may in some cases be a number of segments in the CMAS notification. The one or more identifiers of the CMAS notification and the indicator may be stored, for use in subsequent duplicate notification determinations, at block 1530.

When the CMAS notification is a duplicate notification, the receipt of additional segments of the CMAS notification may be terminated at block 1535, and a number of segments used to assemble a second CMAS notification may be identified at block 1540. The reception of additional CMAS notifications may resume following a time period corresponding to the identified number of segments at block 1545.

Thus, the method 1500 may provide a way to conserve power in a wireless communications system. It should be noted that the method 1500 is just one implementation and that the operations of the method 1500 may be rearranged or otherwise modified such that other implementations are possible.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. For example, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000, as used throughout the specification, refers to Code Division Multiple Access 2000. CDMA2000 is a U.S. registered trademark of the Telecommunications Industry Association (TIA-USA). CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). WiMAX, as used in the specification, relates to Worldwide Interoperability for Microwave Access. WiMAX is U.S. trademark of the WiMAX Forum. 3GPP Long Term Evolution (LTE) and LTE-Advanced (LTE-A) are new releases of UMTS that use E-UTRA. UTRA, E-UTRA, UMTS, LTE, LTE-A, and GSM and are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   receiving one or more segments of a first emergency broadcast message in an access stratum;
   determining that the first emergency broadcast message is a duplicate emergency broadcast message based at least in part on a comparison of one or more identifiers of the received one or more segments associated with the first emergency broadcast message and a notification identifier associated with a second emergency broadcast message, the second emergency broadcast message being a previously received broadcast message;
   terminating receipt of additional segments of the first emergency broadcast message based at least in part on the determination that the first emergency broadcast message is a duplicate emergency broadcast message; and
   resuming reception of emergency broadcast messages following a time period that is based at least in part on an identified number of segments used to assemble the previously-received second emergency broadcast message.

2. The method of claim 1, wherein resuming the reception of the emergency broadcast messages comprises:

resuming reception of a system information block (SIB) used to emergency broadcast segments of the emergency broadcast messages.

3. The method of claim 1, wherein the identified number of segments used to assemble the second emergency broadcast message indicates a length of the first emergency broadcast message.

4. The method of claim 1, wherein the identified number of segments used to assemble the second emergency broadcast message is determined based at least in part on retrieving, from a memory location, a number of segments used to assemble the second emergency broadcast message using the one or more identifiers of the received one or more segments.

5. The method of claim 1, further comprising:
   identifying a receipt of a portion of a third emergency broadcast message during the identified time period; and
   remaining in a receive enabled state to receive the third emergency broadcast message when the third emergency broadcast message is rebroadcasted.

6. The method of claim 1, wherein the terminating the receipt of additional segments of the first emergency broadcast message comprises:
   terminating receipt of a system information block (SIB) used to emergency broadcast segments of the first emergency broadcast message.

7. The method of claim 1, wherein the first emergency broadcast message comprises a commercial mobile alert system (CMAS) notification.

8. The method of claim 1, wherein the first emergency broadcast message comprises an earthquake and tsunami warning system (ETWS) notification.

9. An apparatus for wireless communications, comprising:
   a processor;
   memory in electronic communication with the processor; and
   instructions stored in the memory, the instructions being executable by the processor to:
   receive one or more segments of a first emergency broadcast message in an access stratum;
   determine that the first emergency broadcast message is a duplicate emergency broadcast message based at least in part on a comparison of one or more identifiers of the received one or more segments associated with the first emergency broadcast message and a notification identifier associated with a second emergency broadcast message, the second emergency broadcast message being a previously received broadcast message;
   terminate receipt of additional segments of the first emergency broadcast message; and
   resume reception of emergency broadcast messages following a time period that is based at least in part on an identified number of segments used to assemble the previously-received second emergency broadcast message.

10. The apparatus of claim 9, wherein the instructions to resume reception of emergency broadcast messages are executable by the processor to:
    resume reception of a system information block (SIB) used to emergency broadcast segments of the emergency broadcast messages.

11. The apparatus of claim 9, wherein the identified number of segments used to assemble the second emergency broadcast message indicates a length of the first emergency broadcast message.

12. The apparatus of claim 9, wherein the identified number of segments used to assemble the second emergency broadcast message is based at least in part on retrieving, from a memory location, a number of segments used to assemble the second emergency broadcast message using the one or more identifiers of the received one or more segments.

13. The apparatus of claim 9, wherein the instructions are executable by the processor to:
    identify a receipt of a portion of a third emergency broadcast message during the identified time period; and
    remain in a receive enabled state to receive the third emergency broadcast message when the third emergency broadcast message is rebroadcasted.

14. The apparatus of claim 9, wherein the instructions to terminate receipt of additional segments of the first emergency broadcast message are executable by the processor to:
    terminate receipt of a system information block (SIB) used to emergency broadcast segments of the first emergency broadcast message.

15. The apparatus of claim 9, wherein the first emergency broadcast message comprises a commercial mobile alert system (CMAS) notification.

16. An apparatus for wireless communications, comprising:
    means for receiving one or more segments of a first emergency broadcast message in an access stratum;
    means for determining that the first emergency broadcast message is a duplicate emergency broadcast message based at least in part on a comparison of one or more identifiers of the received one or more segments associated with the first emergency broadcast message and a notification identifier associated with a second emergency broadcast message, the second emergency broadcast message being a previously received broadcast message;
    means for terminating receipt of additional segments of the first emergency broadcast message based at least in part on the determination that the first emergency broadcast message is a duplicate emergency broadcast message; and
    means for resuming reception of emergency broadcast messages following a time period that is based at least in part on an identified number of segments used to assemble the previously-received second emergency broadcast message.

\* \* \* \* \*